United States Patent [19]

Walker

[11] 4,164,817
[45] Aug. 21, 1979

[54] CONDUIT BENDING LEVEL

[75] Inventor: Thomas G. Walker, E. Union Lake, Mich.

[73] Assignee: JDS Products, Inc., Hartland, Mich.

[21] Appl. No.: 902,676

[22] Filed: May 4, 1978

[51] Int. Cl.² .............................................. G01C 9/34
[52] U.S. Cl. ........................................................ 33/371
[58] Field of Search ..................... 33/178 B, 334, 370, 33/371

[56] References Cited

U.S. PATENT DOCUMENTS

| 2,723,126 | 11/1955 | Spluvak | 33/370 X |
| 2,746,163 | 5/1956 | Moritz | 33/370 |
| 3,419,966 | 1/1969 | Rowe | 33/178 B |
| 3,822,481 | 7/1974 | Doan | 33/371 |

FOREIGN PATENT DOCUMENTS 864575 4/1961 United Kingdom ..................... 33/370

Primary Examiner—Charles E. Phillips
Attorney, Agent, or Firm—Barnes, Kisselle, Raisch & Choate

[57] ABSTRACT

A conduit bending level comprising a body of molded resilient material which includes a plurality of progressively tapering coaxially stepped frustoconical body portions each having an outer surface adapted to be received by force-fit into the open end of a conduit of corresponding nominal inside diameter. A spirit level is carried centrally of the body at the wide end thereof perpendicularly of the body axis for indicating orientation of the conduit end during a conduit bending operation.

7 Claims, 4 Drawing Figures

U.S. Patent  Aug. 21, 1979  4,164,817
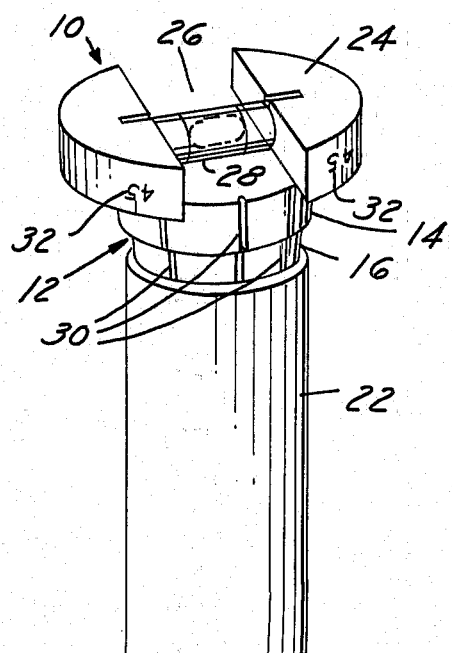
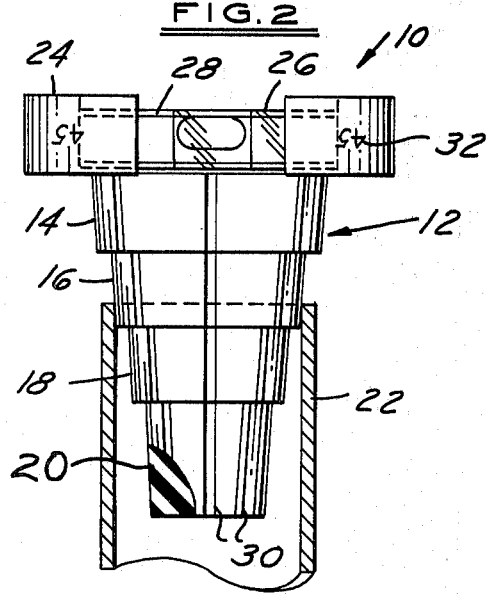
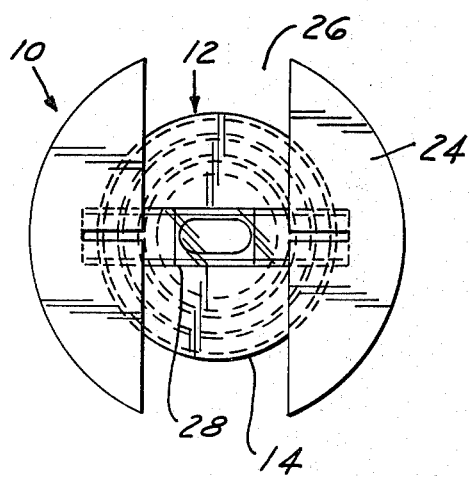
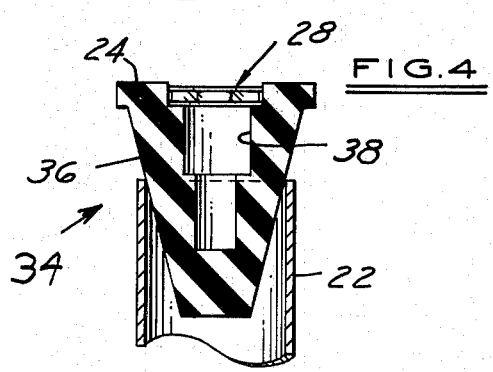

CONDUIT BENDING LEVEL

The present invention relates to level indicating apparatus, and more particularly to a gage or apparatus for indicating orientation of a conduit end during a conduit bending operation.

Prior art apparatus of the subject type are disclosed in Gregory U.S. Pat. No. 2,785,477, Hellwig U.S. Pat. No. 2,842,863 and Rose U.S. Pat. No. 2,907,116.

Objects of the present invention are to provide a conduit bending level or gage of the described type which is economical in assembly, which is compact and rugged in operation and therefore adapted to be carried in a user's tool box, for example, which is provided as a single unit with no moving parts, and/or which is adapted to be used in conjunction with a wide variety of standard conduit sizes.

The invention, together with additional objects, features and advantages thereof, will be best understood from the following description, the appended claims and the accompanying drawings in which:

FIG. 1 is a perspective view of a presently preferred embodiment of the level provided by the invention inserted into one end of a conduit;

FIGS. 2 and 3 are respective elevational and plan views of the conduit bending level illustrated in FIG. 1; and FIG. 4 is an elevational sectional view of an alternative embodiment of the conduit bending level provided by the invention.

Referring to FIGS. 1-3, a presently preferred embodiment 10 of the conduit bending level provided by the invention comprises a body 12 of resilient molded material such as rubber or plastic. Body 12 includes a plurality of progressively inwardly tapering coaxially stepped frustoconical body portions 14, 16, 18 and 20, each having an outer surface adapted to be inserted into an open cylindrical conduit end 22 of corresponding nominal inside diameter and held therein by resilient force-fit. Preferably, each of the body portions 14-20 has a lesser diameter at its narrow end equal to or slightly less than a standard nominal conduit inside diameter. Lesser diameters of three-quarters of an inch, one inch, one and one-quarter inches and one and one-half inches for respective portions 20, 18, 16 and 14 are preferred. Thus, body 12 may be inserted axially into conduit end 22 (FIG. 2) until the tapering body portion corresponding to the nominal conduit inside diameter, in this case body portion 16, engages the conduit end edge, at which point additional manual axial pressure on level 10 will force the engaged body portion resiliently into the conduit. Preferably, body portions 14-20 have nominal taper angles on the order of three degrees with respect to the axis of body 12.

A radial lip or flange 24 extends around the end of body portion 14 of greater diameter and has a viewing slot 26 extending transversely therethrough. A conventional bulb or spirit level 28 is centrally carried by body 12 transversely across slot 26 and generally perpendicularly of the axis of the tapering body portions. Thus, with body 12 inserted and held by force-fit in conduit end 22 as illustrated in FIGS. 1 and 2, spirit level 28 may be referenced after each of a plurality of bending operations on conduit end 22 or the opposing conduit end (not shown) for indicating orientation of the conduit, and thereby showing that the conduit is level prior to a subsequent bend. For a more detailed general discussion of the use of a conduit bending level during a bending operation, reference may be had to the above-referenced patents, particularly the Hellwig patent.

A circumferential array of slots 30 is molded into each of respective body portions 14-20, corresponding slots of each array being in alignment axially of body 12 with indicia illustrated at 32 on flange 24 for providing an angular reference with respect to spirit level 28.

FIG. 4 illustrated an alternative embodiment 34 of the invention wherein the level body 36 comprises a continuously tapering frustoconical body surface at a preferred taper angle of fifteen degrees. Stepped cylindrical apertures 38 are cored or molded into body 36 to add resiliency to the body for force-fit and retention in conduit end 22. Spirit level 28 is centrally located as described above.

The invention claimed is:

1. A level for use in bending conduit having a conduit end opening within a preselected nominal dimension range comprising an axially tapering body of resilient material having a cross-sectional dimension at one axial end which is below said preselected range and a cross-sectional dimension at the other axial end which is above said range such that said body is constructed to be axially telescopically received and retained by force-fit within a conduit end opening at a point along the axial dimension of said body which corresponds to the dimension within said range of the said end opening, and a spirit level mounted in fixed position on said body adjacent said other axial end to be disposed externally of the said conduit end opening when said body is retained therein for indicating orientation of the conduit end during a conduit bending operation wherein upon engagement of said tapered body portion in a conduit, additional axial pressure will force the engaged body portion resiliently into said conduit to retain this position during conduit bending operations.

2. The level set forth in claim 1 wherein said nominal dimension range is between the three-quarters of an inch to one and one-half inches.

3. The conduit bending level set forth in claim 1 wherein said body includes at least one frustoconical outer surface portion adapted to be force-fitted into an open end of a generally cylindrical conduit.

4. The conduit bending level set forth in claim 3 wherein said spirit level is carried centrally of said body adjacent the wide end thereof and is oriented perpendicularly of the axis of said body.

5. A conduit bending level comprising a body constructed of resilient material and including a plurality of progressively tapering coaxially stepped frustoconical body portions each having an outer surface adapted to be received and retained by force-fit in an open conduit end of corresponding nominal inside diameter, and level sensing means comprising a spirit level centrally carried at a wide end of said body generally perpendicular to the body axis to be disposed externally of a said conduit end for indicating orientation of the conduit end during a conduit bending operation.

6. The conduit bending level set forth in claim 5 wherein said frustoconical body portions each have a taper angle of substantially three degrees.

7. A conduit bending level comprising an axially tapering body of resilient material and including a plurality of progressively tapering coaxially stepped frustoconical body portions each having an outer surface adapted to be received by resilient force-fit into an open conduit end of corresponding nominal inside diameter, and a spirit level carried by said body and adapted to be disposed externally of a conduit end when said body is retained therein for indicating orientation of the conduit end during a conduit bending operation.

* * * * *